Plummer & Noyes,
Clutch.
No. 109,450. Patented Nov. 22, 1870.

Witnesses.
N. B. Smith
Alex. Mahon

Inventors.
John E. Plummer
Joseph P. Noyes
by their attorney
H. H. Doubleday

N. PETERS, PHOTO-LITHOGRAPHER, WASHINGTON, D. C.

United States Patent Office.

JOHN E. PLUMMER AND JOSEPH P. NOYES, OF BINGHAMTON, NEW YORK.

Letters Patent No. 109,450, dated November 22, 1870.

IMPROVEMENT IN CLUTCHES FOR MACHINERY.

The Schedule referred to in these Letters Patent and making part of the same.

We, JOHN E. PLUMMER and JOSEPH P. NOYES, of Binghamton, in the county of Broome, and State of New York, have invented certain Improvements in Clutch for Pegging-Machines, of which the following is a specification.

Our invention relates to the combination, arrangement and application of a clutch and switch for connecting and disconnecting the fly-wheel or pulley from the main shaft of the ordinary pegging-machine, in such a manner that said fly-wheel or pulley may be made to work loosely on the shaft, or be connected with it and give motion to the operating parts of the machine, whereby the machine may be instantly stopped and put in motion again at any desired point of the work.

Figure 1 in the accompanying drawing is a view of the fly-wheel or pulley connected, embodying our invention.

A is the driving-pulley or fly-wheel, which is hung loosely on the main shaft B.

Figure 3:
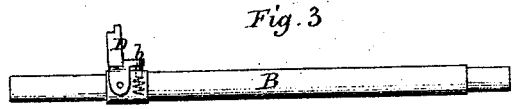
Figure 3 is the clutch and shaft detached.
Figure 4:
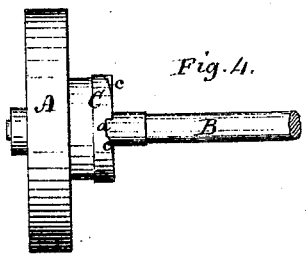
Figure 4 shows the fly-wheel or pulley and annular notched flange, with a section of the shaft.
Figure 5:
Figure 5 is a section of the switch, showing the disengaging-finger and detent to hold the clutch.

On the inside of this pulley is a projecting annular flange C, with notches $a\ a$ for the reception of the clutch D, which is hinged to the main shaft B, and made to enter said notches by the pressure of a spiral spring working in a transverse hole in the shaft upon a projection, $b$, on the clutch D, as shown in fig. 3.

The notches $a\ a$ in the flange C have a full bearing on their working sides, and a partial bearing or shoulder on the other side, to prevent the "back-lash" of the clutch occasioned by the alternate lifting and dropping of the "peg-driver."

On this side the edges $c\ c$ are tapered down to allow the clutch D to pass freely into the notch $a$.

Figure 1:
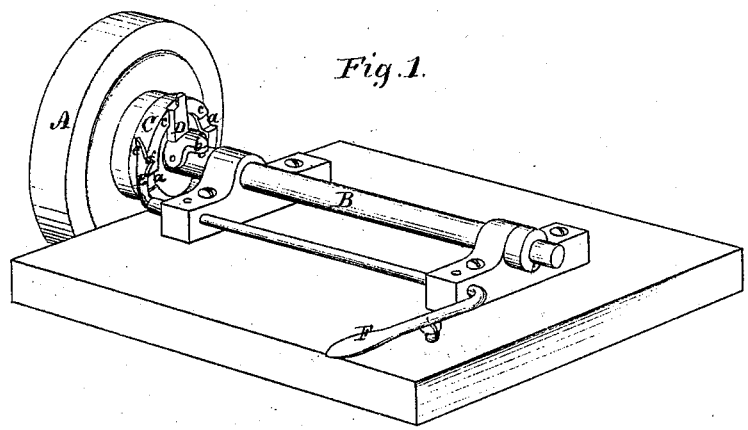
Figure 2:
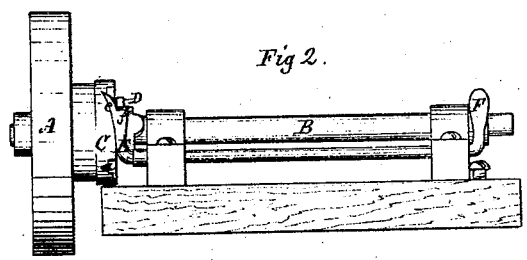
Figure 2 shows the clutch disconnected, and secured in the detent of the switch.

E is the switch, which is operated by the handle F. This switch is bent to correspond with the circular form of the flange C, and has a projecting finger, $e$, which, when brought in contact with the face of the flange C, engages with the projecting end of the clutch D, and by the momentum of the fly-wheel throws it into the detent $f$, in which position it is shown in fig. 2.

In using our invention, the pulley or fly-wheel A being loose or disconnected with the shaft B, is first put in motion at a speed of about four hundred revolutions per minute. The handle F of the switch is then depressed, which disengages the clutch D from the detent $f$, which clutch slides into the notch $a$, as before described, thereby connecting the fly-wheel or pulley A with the main shaft, and giving motion to the machine.

The machine is stopped by raising the handle, which engages the finger $e$ of the switch with the clutch D, and throws it into the detent, as described, whereby the operation of pegging may be instantly suspended at any desired position of the work, leaving no "awl-holes" unfilled in the space, accomplishing more work in a given time with better results, and with less wear and derangement of the machine than by the ordinary method.

We claim as our invention—

The combination and arrangement of clutch D and switch E, handle F and detent $f$, with the annular notched flange C, fly-wheel or pulley A, spring $o$ and shaft B, all being constructed and operating as hereinbefore set forth.

J. E. PLUMMER.
J. P. NOYES.

Witnesses:
S. W. ROGERS,
J. W. ROBIE.